United States Patent
Li (10) Patent No.: US 11,470,770 B2
(45) Date of Patent: Oct. 18, 2022

(54) AUTOMATIC LAWN TRIMMER AND AUTOMATIC LAWN TRIMMING METHOD

(71) Applicant: Zhejiang Geely Holding Group Co., LTD., Hangzhou (CN)

(72) Inventor: Shufu Li, Hangzhou (CN)

(73) Assignee: ZHEJIANG GEELY HOLDING GROUP CO., LTD., Hangzhou (CN)

( * ) Notice: Subject to any disclaimer, the term of this patent is extended or adjusted under 35 U.S.C. 154(b) by 477 days.

(21) Appl. No.: 16/615,130

(22) PCT Filed: Jun. 14, 2018

(86) PCT No.: PCT/CN2018/091322
§ 371 (c)(1),
(2) Date: Nov. 19, 2019

(87) PCT Pub. No.: WO2019/062212
PCT Pub. Date: Apr. 4, 2019

(65) Prior Publication Data
US 2020/0100425 A1    Apr. 2, 2020

(30) Foreign Application Priority Data
Sep. 28, 2017 (CN) .......................... 201710901497.8

(51) Int. Cl.
*A01D 34/00* (2006.01)
*A01D 34/74* (2006.01)
(Continued)

(52) U.S. Cl.
CPC ........... *A01D 34/008* (2013.01); *A01D 34/74* (2013.01); *A01D 34/78* (2013.01); *A01D 43/006* (2013.01);
(Continued)

(58) Field of Classification Search
CPC .... A01D 34/008; A01D 43/006; A01D 34/74; A01D 34/78; A01D 34/015;
(Continued)

(56) References Cited

U.S. PATENT DOCUMENTS

2003/0023356 A1    1/2003    Keable

FOREIGN PATENT DOCUMENTS

CN    103234460 A    8/2013
CN    204031898 U   12/2014
(Continued)

OTHER PUBLICATIONS

Dalecky et al.; SmartMowers as part of a SmartCity; 2016 17th Intl. Carpathian Control Conf. (ICCC); pp. 156-160 (Year: 2016).*

*Primary Examiner* — Michael J Zanelli
(74) *Attorney, Agent, or Firm* — Cheng-Ju Chiang (57) ABSTRACT

An automatic lawn compactor includes a case, a battery pack, a controller, a driving device and a trampling device. The battery pack is disposed in the case. The battery pack is configured to supply electrical power to the driving device. The controller is connected with the driving device for controlling the driving device. The driving device is configured to drive the automatic lawn compactor to move autonomously on the lawn. The grass on the lawn is trampled by the trampling device as the automatic lawn compactor moves on the lawn. Through regular trampling the lawn, the grass on the lawn is kept at a certain height to realize the beauty and ornamentality of the lawn. The automatic lawn compactor overcomes the shortcomings of large noise, the difficulty of cleaning up the grass, and the hard work by the existing lawn compactors.

13 Claims, 7 Drawing Sheets

(51) Int. Cl.
*A01D 34/78* (2006.01)
*A01D 43/00* (2006.01)
*G05D 1/02* (2020.01)
*A01D 101/00* (2006.01)

(52) U.S. Cl.
CPC ......... *G05D 1/0219* (2013.01); *G05D 1/0246* (2013.01); *A01D 2101/00* (2013.01); *G05D 2201/0208* (2013.01)

(58) Field of Classification Search
CPC ............. A01D 2101/00; G05D 1/0219; G05D 1/0246; G05D 2201/0208; G05B 19/04
See application file for complete search history.

(56) References Cited

FOREIGN PATENT DOCUMENTS

| | | | | |
|---|---|---|---|---|
| CN | 104429661 | A | 3/2015 | |
| CN | 204443247 | U | 7/2015 | |
| CN | 204796171 | U | 11/2015 | |
| CN | 106054898 | A | 10/2016 | |
| CN | 106161489 | A | 11/2016 | |
| CN | 205737785 | U | 11/2016 | |
| CN | 106416587 | A | 2/2017 | |
| CN | 106851567 | A | 6/2017 | |
| CN | 206333252 | U | 7/2017 | |
| CN | 206491007 | U | 9/2017 | |
| CN | 206517812 | U | 9/2017 | |
| EP | 1251727 | A1 | 8/2001 | |
| EP | 3156873 | A1 * | 4/2017 | ........... G05D 1/0088 |
| JP | S49-46566 | U | 4/1974 | |
| JP | 2016-22576 | A | 2/2016 | |
| JP | 2016-28311 | A | 2/2016 | |
| KR | 10-2014-0111148 | * | 9/2014 | ............. A01G 20/30 |

* cited by examiner

AUTOMATIC LAWN TRIMMER AND AUTOMATIC LAWN TRIMMING METHOD

CROSS-REFERENCE TO RELATED APPLICATION

The present application is a 35 U.S.C. § 371 National Phase conversion of International Patent Application No. PCT/CN2018/091322, filed on Jun. 14, 2018, which is based on and claims the priority of Chinese patent application No. 201710901497.8, filed on Sep. 28, 2017. The entire disclosure of the above-identified application is incorporated herein by reference. The PCT International Patent Application was filed and published in English.

TECHNICAL FIELD

The present application relates to tools for compacting lawn, and particularly to an automatic lawn compactor and an automatic lawn compacting method.

BACKGROUND ART

In lawn compacting, people often use lawn compactors. They need to cut off the grass according to the required length, to improve the beauty and ornamental quality of the lawn. However, the existing lawn compactors have some inherent shortcomings because of its characteristics, such as large noise, difficult to clean up the cut grass, involving hard work.

For this problem, the inventor found by accident that, after being trampled by the car tyres in short time over a long term, the grass on the lawn not only does not die, but keeps in the range of suitable ornamental length. This discovery provides a way of thinking for the design of the technical solution of the present application.

Technical Solution

In view of the above, it is necessary to provide an automatic lawn compactor and an automatic lawn compacting method, to overcome the shortcomings of large noise, difficult to clean up the cut grass, and involving hard work by the existing lawn compactors.

An embodiment of the present application provides an automatic lawn compactor, which includes a case, a battery pack, a controller, a driving device and a trampling device. The battery pack is disposed in the case. The battery pack is configured to supply electrical power to the driving device. The controller is connected with the driving device for controlling the driving device. The driving device is configured to drive the automatic lawn compactor to move autonomously on the lawn. The grass on the lawn is trampled by the trampling device as the automatic lawn compactor moves on the lawn.

An embodiment of the present application further provides an automatic lawn compacting method, which includes:

providing the above automatic lawn compactor;

using a height sensor provided on the automatic lawn compactor to detect a height of the grass on the lawn;

wherein when the height of the grass on the lawn detected by the height sensor is greater than a preset height, the height sensor sending a signal to the controller, the controller controlling the automatic lawn compactor to activate its automatic compacting function according to the signal, the driving device driving the automatic lawn compactor to move autonomously on the lawn, the grass on the lawn being trampled by the trampling device as the automatic lawn compactor moves on the lawn.

Advantageous Effects

According to the automatic lawn compactor and the automatic lawn compacting method provided by the embodiment of the present application, the grass on the lawn is kept at a certain height to realize the beauty and ornamentality of the lawn by regular trampling, to overcome the shortcomings of large noise, difficult to clean up the cut grass, and involving hard work by the existing lawn compactors.

MODE FOR INVENTION

In order to make the purposes, characteristics, and advantages of the present application more apparently, embodiments of the present application will now be described in more detail with reference to the accompanying drawings.

Referring from FIG. 1 to FIG. 5, an automatic lawn compactor 100 is provided in an embodiment of the present application. The automatic lawn compactor 100 includes a case 101, a battery pack 102, a controller 103, a driving device 130 and a trampling device 140.

The battery pack 102 is disposed in the case 101. The quantity of the battery pack 102 may be one or multiple. The battery pack 102 is connected with the driving device 130 and supplies electric power to the driving device 130. The controller 103 is connected with the driving device 130 for controlling the driving device 130. The driving device 130 is configured to drive the automatic lawn compactor 100 to move autonomously on the lawn. The grass on the lawn is trampled by the trampling device 140 as the automatic lawn compactor 100 moves on the lawn.

In the embodiment, the driving device 130 includes a driving motor 131 and a driving wheel 132. The controller 103 is connected with the driving motor 131. The driving motor 131 is connected with the driving wheel 132. The driving motor 131 is configured to drive the driving wheel 132 to rotate. The trampling device 140 is a driven trampling wheel 141. The driven trampling wheel 141 rolls on the lawn under the driving of the driving wheel 132. As the driving wheel 132 drives the automatic lawn compactor 100 to move on the lawn, the driven trampling wheel 141 rolls under the driving of the driving wheel 132, to trample the grass on the lawn.

In the embodiment, the driving wheel 132 is provided as the rear wheel, and the driven trampling wheel 141 is provided as the front wheel. The quantity of the driving wheel 132 is two, and each driving wheel 132 is driven correspondingly by a driving motor 131. The driving wheel 132 also acts as the steering wheel. The driving wheel 132 can be inflatable wheel, solid wheel, or crawler wheel.

As the automatic lawn compactor 100 moves on the lawn, the driving motors 131 at two sides can rotate in the same direction and at the same speed. When the automatic lawn compactor 100 needs to make a turn, it can be done by turning in place or turning around. When making a turn by turning in place, the driving motor 131 at one side and the driving motor 131 at the other side are rotated at the same speed, but in different direction. When making a turn by turning around, the driving motor 131 at one side stops rotation or is rotated at low speed, but the driving motor 131 at the other side is rotated at high speed.

In the embodiment, the driven trampling wheel 141 is detachable. That is, the driven trampling wheel 141 is detachably mounted to the case 101, such that the user can choose the trampling wheel of different weight or different type according to the grass type of the lawn.

Figure 1:
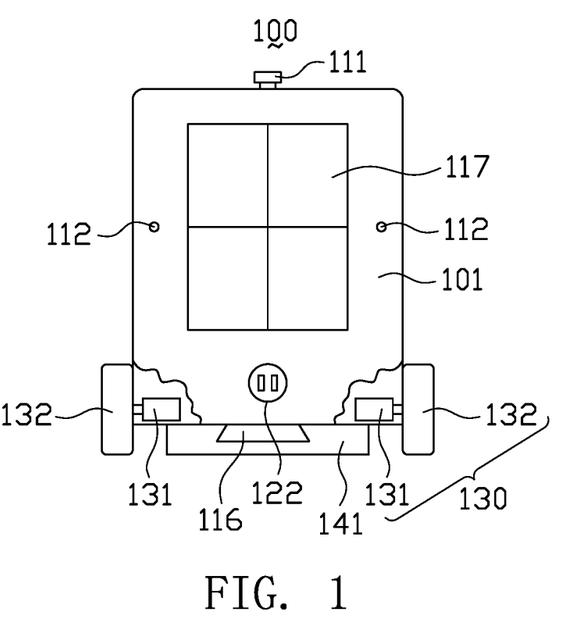
FIG. 1 is a front schematic view of an automatic lawn compactor according to an embodiment of the present application.
Figure 2:
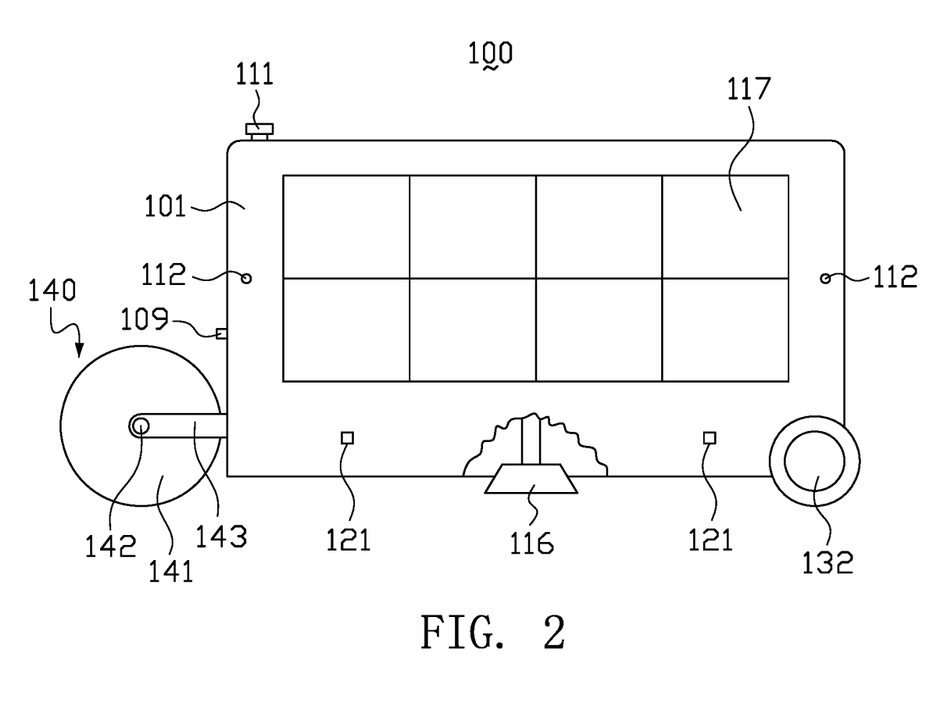
FIG. 2 is a side schematic view of the automatic lawn compactor of FIG. 1.
Figure 3:
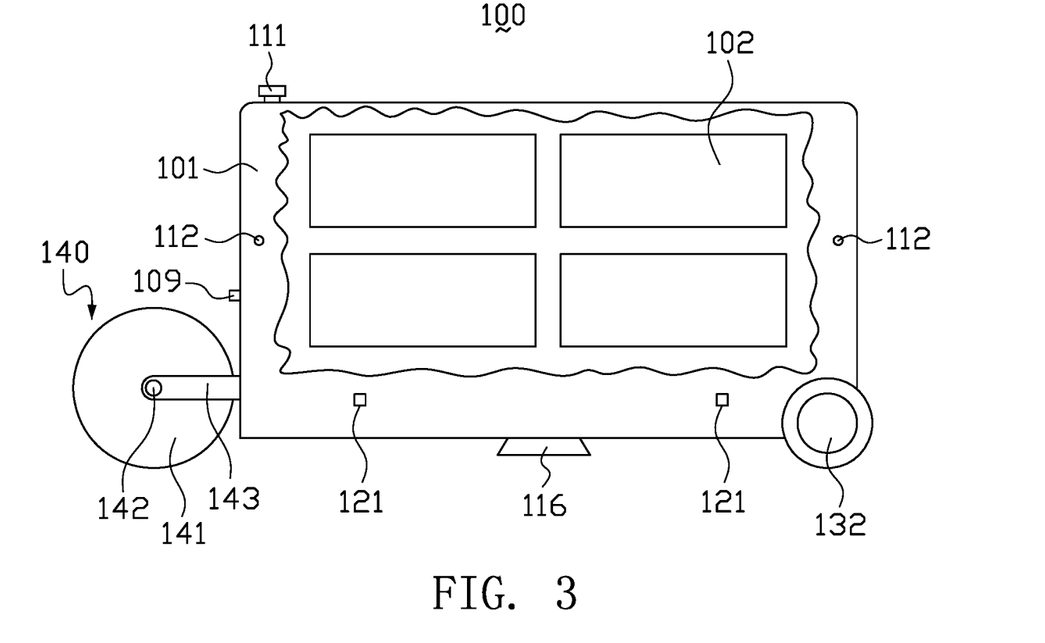
FIG. 3 is a view showing the automatic lawn compactor of FIG. 2 by removing a portion of the side plate.
Figure 4:
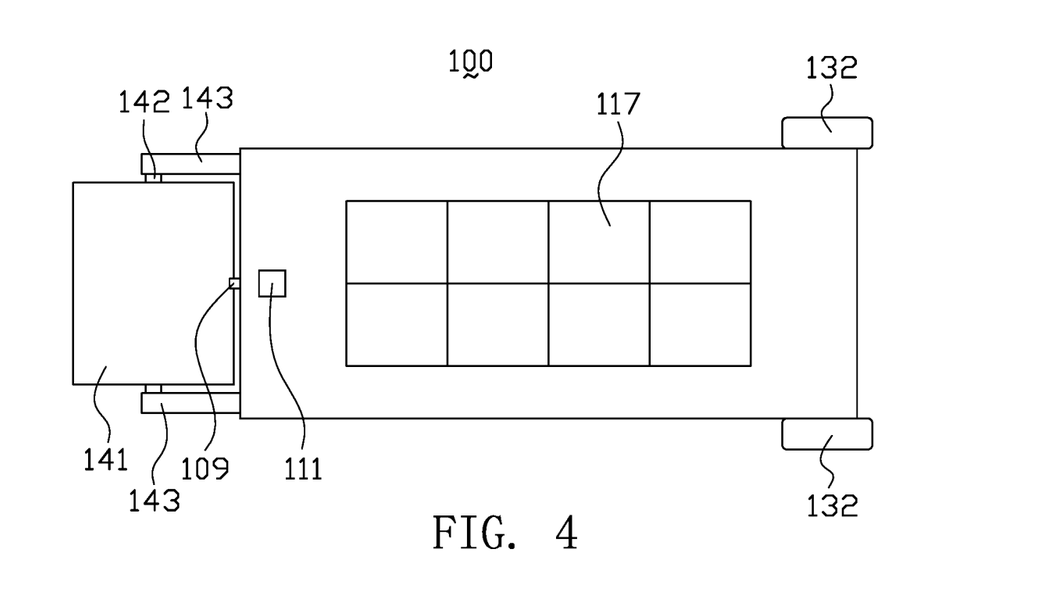
FIG. 4 is a top schematic view of the automatic lawn compactor of FIG. 2.

In the embodiment, the driven trampling wheel 141 is mounted to a shaft 142. The front of the case 101 is fixed with two brackets 143. Two ends of the shaft 142 are rotatably mounted to the two brackets 143, respectively, so that the shaft 142 and the driven trampling wheel 141 together can rotate relative to the two brackets 143.

Figure 5:
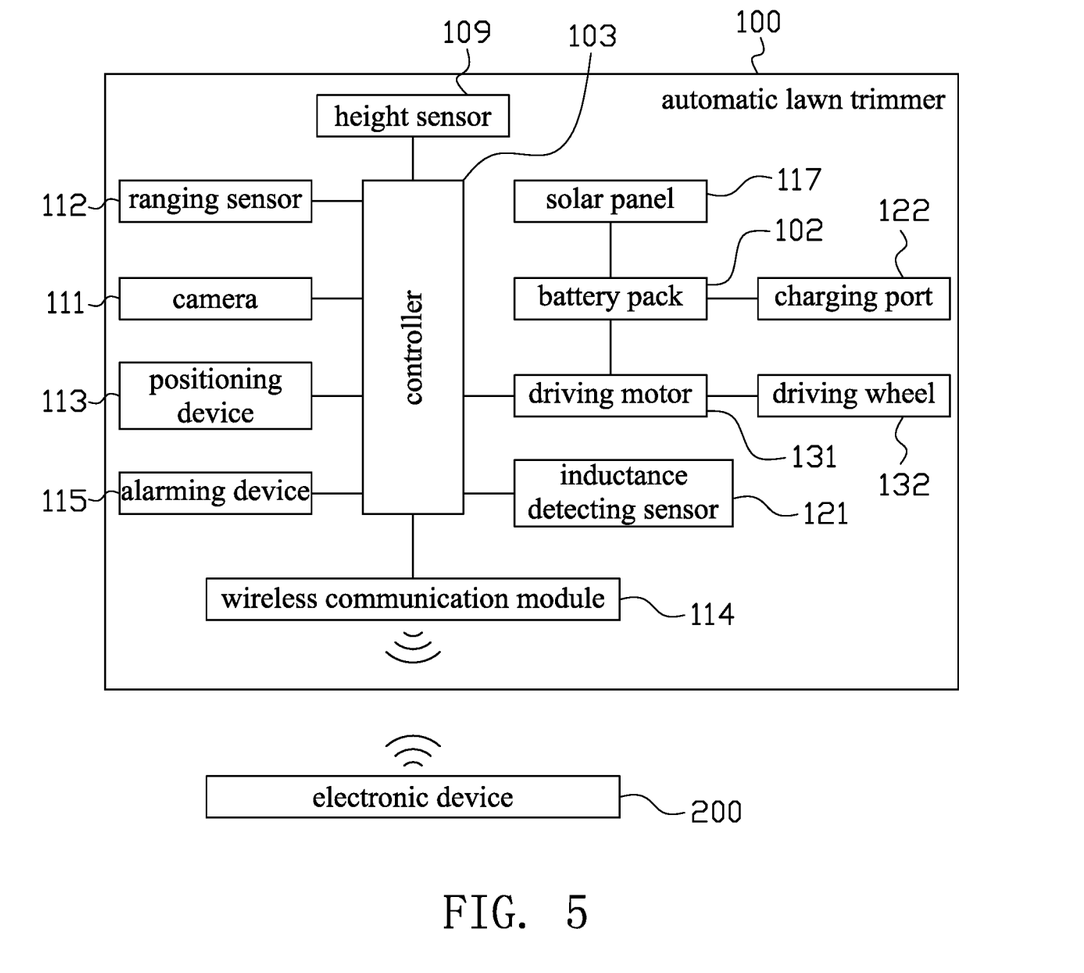
FIG. 5 is a block diagram of the automatic lawn compactor of the embodiment of the present application.

In the embodiment, the automatic lawn compactor 100 further includes a height sensor 109 for detecting the height of the grass on the lawn. For example, the height sensor 109 can be provided at the front of the case 101. The height sensor 109 is connected with the controller 103. A height threshold value for the grass on the lawn can be set, for example, 10 cm, and the height threshold value is preset in the controller 103. The height sensor 109 sends its detecting result to the controller 103. When the height of the grass on the lawn detected by the height sensor 109 is greater than the height threshold value, the controller 103 controls the automatic lawn compactor 100 to activate its automatic compacting function. Therefore, the automatic lawn compactor 100 can activate its compacting function automatically according to the detected height of the grass on the lawn. Through regular trampling the lawn, the grass on the lawn is kept at a certain height to realize the beauty and ornamentality of the lawn, to overcome the shortcomings of large noise, difficult to clean up the cut grass, and involving hard work by the existing lawn compactors. That is, cutting grass in the existing lawn compactors is substituted by trampling grass in the present application.

The frequency of compacting in spring and summer is higher, and the frequency of compacting in autumn and winter is low. For example, the frequency of compacting in spring and summer is 4 times per month, and the frequency of compacting in autumn and winter is 2 times per month. Since the trampling lasts for a period of time, the compacting each time can last 2-3 days and the grass is trampled 2 times each day.

In the embodiment, the automatic lawn compactor 100 further includes a camera 111. For example, the camera 111 is provided at the front of the case 101. The camera 111 can be a 360° panoramic camera. Therefore, a 360° camera system can be constructed using the panoramic camera 111.

By scanning a surrounding environment of the lawn, a 2D map can be built for autonomous positioning, i.e., using the VSLAM technology (visual simultaneous localization and mapping), to realize autonomous positioning and map building using the visual system. The 2D map is stored in the controller 103, and the grass on the whole lawn is trampled according to the 2D map. The route during trampling the grass can be linear reciprocating motions.

In the embodiment, the automatic lawn compactor 100 further includes a ranging sensor 112. The ranging sensor 112 is connected with the controller 103. The ranging sensor 112 is configured to detect an information of obstacles in a surrounding environment of the case 101 as the automatic lawn compactor 100 moves on the lawn. According to the detecting result by the ranging sensor 112, the controller 103 controls the automatic lawn compactor 100 to move on the lawn by keeping away from the obstacles. The ranging sensor 112 may be multiple, and the multiple ranging sensors 112 are distributed over the outer surface of the case 101. Specifically, the ranging sensor 112 can be selected from infrared ranging sensor, ultrasonic ranging sensor, laser ranging sensor, and radar ranging sensor.

In the embodiment, the automatic lawn compactor 100 further includes a positioning device 113, a wireless communication module 114 and an alarming device 115. The positioning device 113 is configured to obtain a positioning information of the automatic lawn compactor 100. The positioning device 113 can be global positioning system (GPS) or Beidou navigation positioning system. The case 101 can be positioned in real time through the positioning device 113. When the current position of the automatic lawn compactor 100 obtained by the positioning device 113 is beyond the preset range, the controller 103 controls the alarm device 115 for alarm, and the wireless communication module 114 sends the current position information of the automatic lawn compactor 100 and the image information captured by the camera 111 to an electronic device 200, such that the user can understand the current position of the automatic lawn compactor 100, and it is easy to track after the automatic lawn compactor 100 is stolen. The electronic device 200 may be smart phones, smart watches, or tablet computers, and it can also be a server set up on a monitoring platform.

When the automatic lawn compactor 100 is deliberately destroyed by a person in outdoor, the controller 103 will control the alarming device 115 for alarm, and the wireless communication module 114 sends the image information captured by the camera 111 to the user's electronic device 200, so that it is easy to find the destroyer.

In addition, by sending the image information captured by the camera 111 to the user's electronic device 200 via the wireless communication module 114, it is also convenient for the user to understand the progress of trampling operation of the automatic lawn compactor 100.

In the embodiment, there is provided with a vacuum cleaning device 116 under the case 101 of the automatic lawn compactor 100, for cleaning up the litter on the lawn, such as small stones or small rubbish.

In the embodiment, the automatic lawn compactor 100 further includes a solar panel 117. The solar panel 117 is provided on the outer surface (e.g., side surface and top surface) of the case 101. The solar panel 117 is electrically connected with the battery pack 102. The battery pack 102 can be charged by the solar panel 117. Because the use frequency of the automatic lawn compactor 100 is not high, solar energy can be collected and stored to drive the automatic lawn compactor 100.

Figure 6:
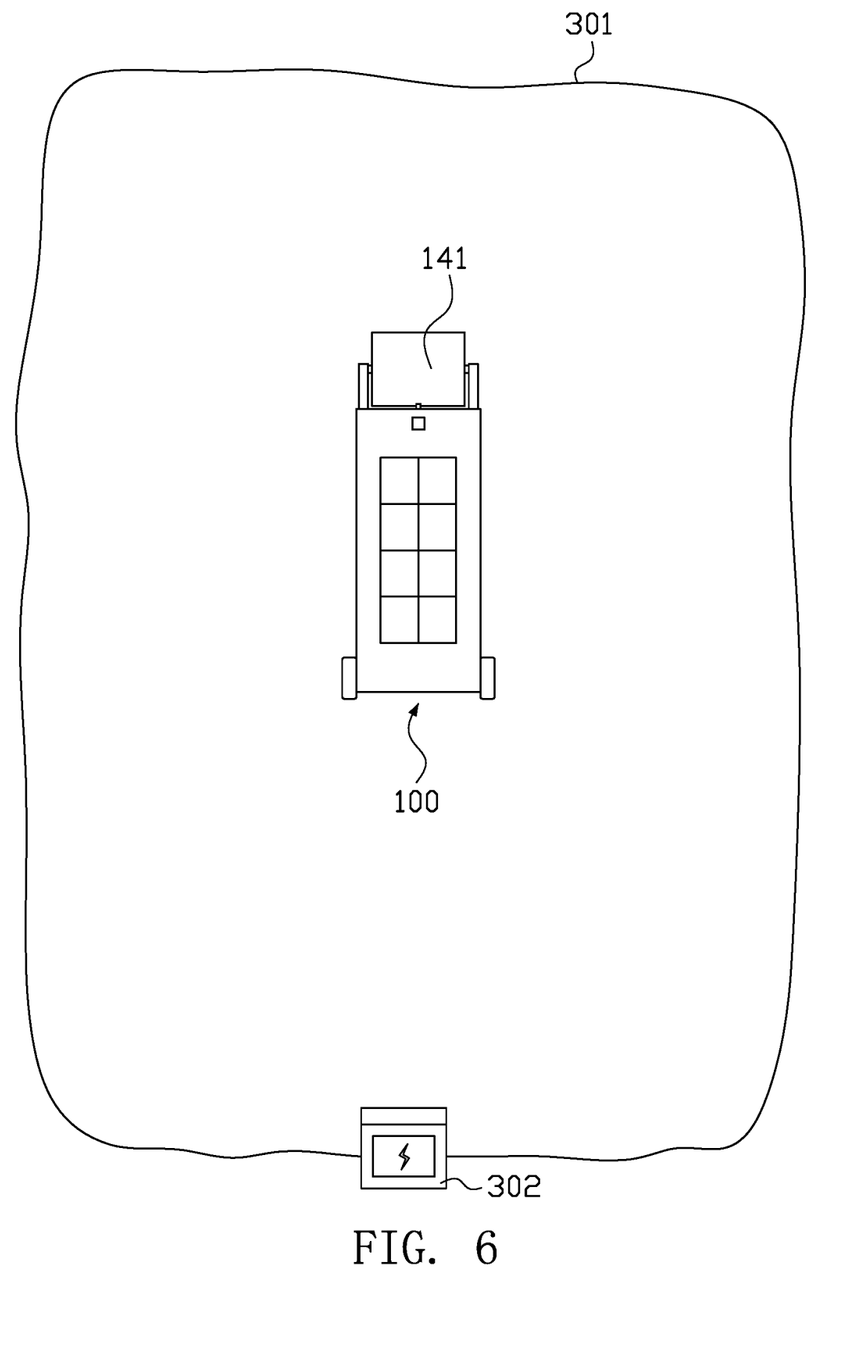
FIG. 6 is a schematic view showing the automatic lawn compactor is performing a trampling operation on the lawn.

Referring to FIG. 5 and FIG. 6, the user can set an electronic fence 301 on the lawn which is required to be trampled. The automatic lawn compactor 100 further includes an inductance detecting sensor 121. The inductance detecting sensor 121 is connected with the controller 103. The inductance detecting sensor 121 can be provided at two sides of the case 101 (see FIG. 2). The inductance detecting sensor 121 can detect the electronic fence 301 and recognize it as the boundary for the automatic lawn compactor 100 during trampling operation. According to the detecting result of the inductance detecting sensor 121, the controller 103 controls the automatic lawn compactor 100 to perform the trampling operation in the area defined by the electronic fence 301.

In the embodiment, the case 101 is provided with a charging port 122 which is electrically connected with the battery pack 102. A charging station 302 is provided on the electronic fence 301 for charging the automatic lawn compactor 100. When the automatic lawn compactor 100 encounters a shortage of electricity or has finished the trampling task, the controller 103 of the automatic lawn compactor 100 detects and tracks the electronic fence 301 using the inductance detecting sensor 121, such that the automatic lawn compactor 100 returns automatically to the charging station 302 for being charged.

Figure 7:
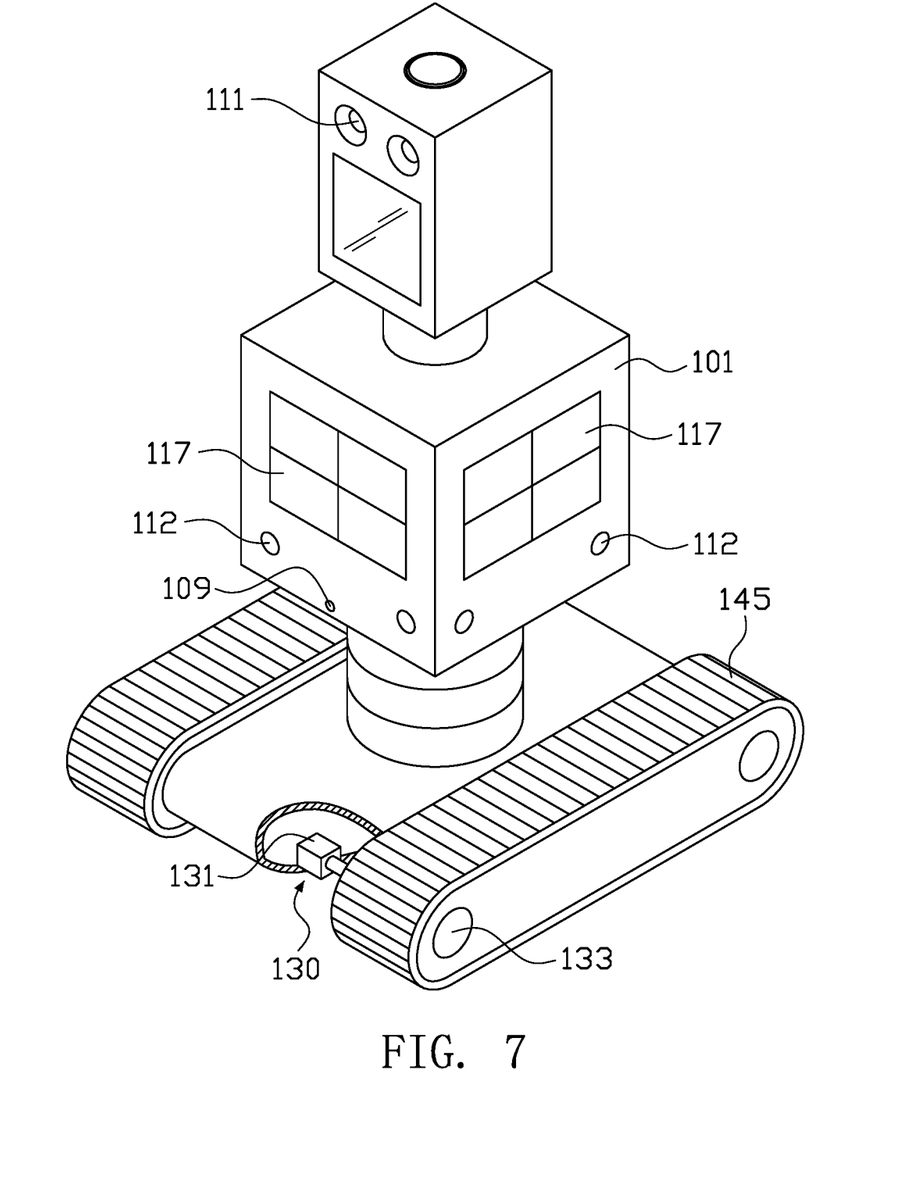
FIG. 7 is an isometric view of an automatic lawn compactor according to another embodiment of the present application.

Referring to FIG. 7, in the automatic lawn compactor 100 provided by another embodiment of the present application, the driving device 130 includes a driving motor 131 and a crawler wheel 133. The controller 103 is connected with the driving motor 131. The driving motor 131 is connected with the crawler wheel 133. The driving motor 131 is configured to drive the crawler wheel 133 to rotate. The trampling device 140 is a crawler 145 mounted on the crawler wheel 133. In the embodiment, the automatic lawn compactor 100 moves using crawler. The large grounding area of the crawler wheel 133 can ensure the area of trampling grass, and it can smoothly pass all kinds of complex road conditions and obstacles. For other structures and working principles of this embodiment, reference can be made to the above first example, and they are omitted here for clarity.

Figure 8:
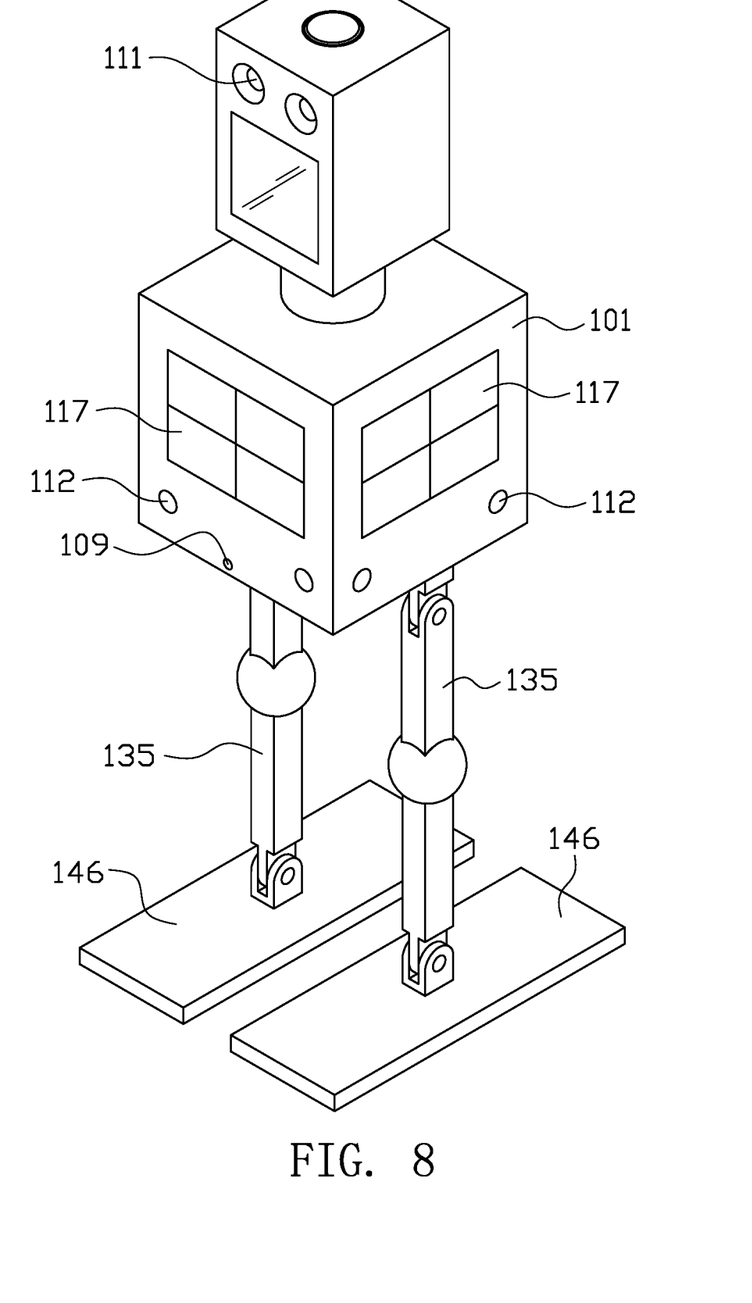
FIGS. 8-9 are isometric views of automatic lawn compactors according to further embodiments of the present application.
Figure 9:
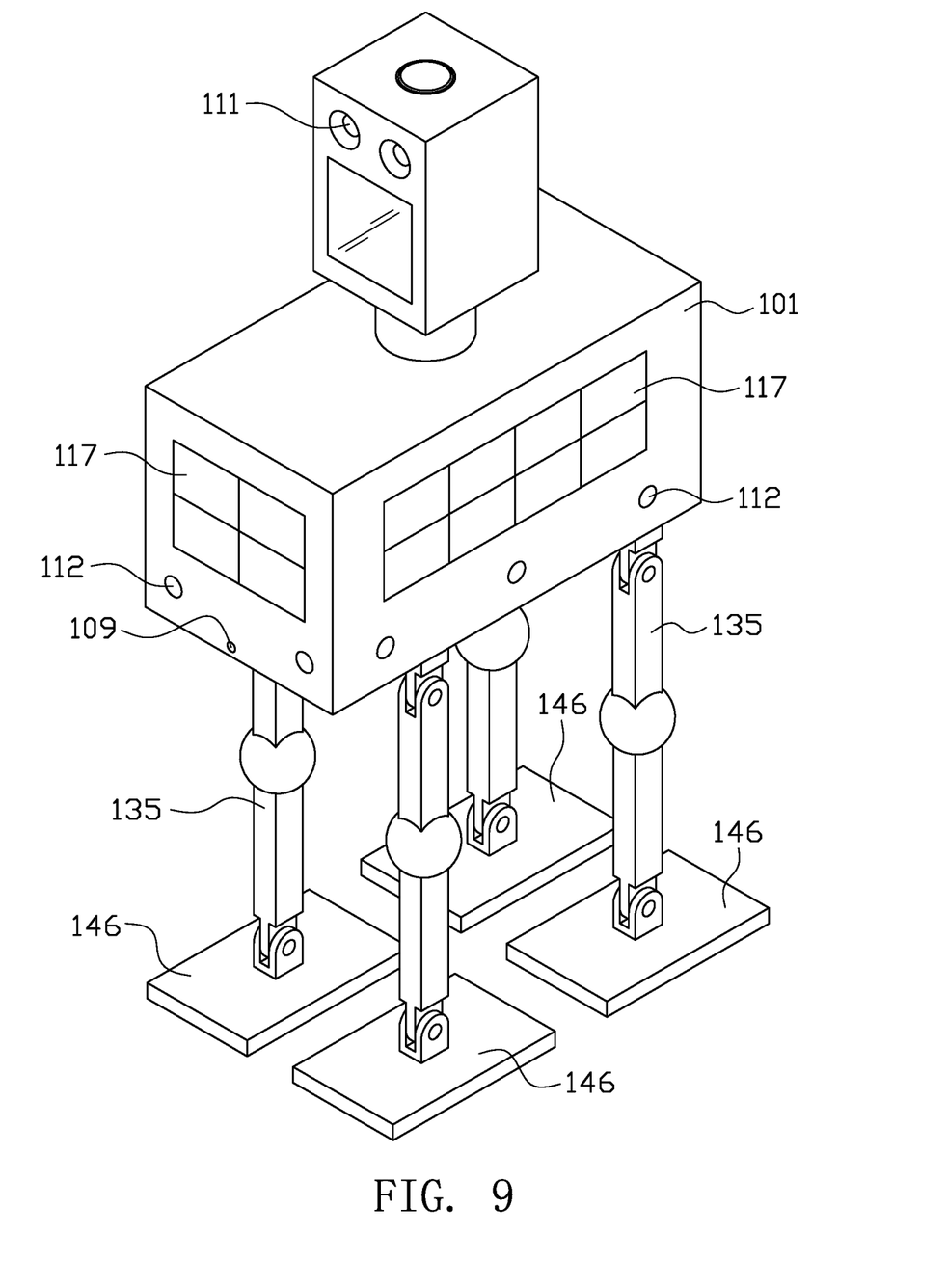

Referring to FIGS. 8-9, in the automatic lawn compactor 100 provided by further embodiments of the present application, the driving device 130 includes at least two walking legs 135. The driving device 130 is configured to drive the at least two walking legs 135 to move alternately. The trampling device 140 are pressing plates 146 mounted on the at least two walking legs 135. FIG. 8 illustrates two walking legs 135, while FIG. 9 illustrates four walking legs 135, but it is not limited thereto. The quantity of the walking legs 135 can be two, three, four, or even more. In order to realize the alternate movement of the multiple walking legs 135, different driving devices can be used. For example, the driving device 130 may further include a stepping driving motor and a connecting rod mechanism. By using the stepping motor and the connecting rod mechanism to control the walking legs 135, the walking legs 135 can move up and down, and can move ahead alternately. In the embodiment, the automatic lawn compactor 100 has the appearance of a humanoid robot, but it is not limited. When the driving device 130 drives the walking legs 135 of the automatic lawn compactor 100 to move alternately on the lawn, the pressing plates 146 at the bottom of the walking legs 135 trample the grass on the lawn. The large grounding area of the pressing plates 146 can ensure the area of trampling grass and pass all kinds of complex road conditions and obstacles. For other structures and working principles of this embodiment, reference can be made to the above first example, and they are omitted here for clarity.

Further, the embodiment of the present application provides an automatic lawn compacting method, which includes:

providing the above automatic lawn compactor 100;

using a height sensor 109 provided on the automatic lawn compactor 100 to detect a height of the grass on the lawn;

when the height of the grass on the lawn detected by the height sensor 109 is greater than a preset height, the height sensor 109 sending a signal to the controller 103, the controller 103 controlling the automatic lawn compactor 100 to activate its automatic compacting function according to the signal, the driving device 130 driving the automatic lawn compactor 100 to move autonomously on the lawn, the grass on the lawn being trampled by the trampling device 140 as the automatic lawn compactor 100 moves on the lawn, thereby keeping the grass on the lawn at a certain height after regular trampling and realizing the beauty and ornamentality of the lawn, to overcome the shortcomings of large noise, difficult to clean up the cut grass, and involving hard work by the existing lawn compactors.

The above are embodiments of the present application only, and should not be deemed as limitations to the present application. Although the present application has been disclosed in embodiments as above, it is not intended to limit the present application. It should be noted that variations and improvements will become apparent to those skilled in the art to which the present application pertains. Therefore, the scope of the present application is defined by the appended claims.

INDUSTRIAL APPLICABILITY

According to the automatic lawn compactor and the automatic lawn compacting method provided by the embodiment of the present application, the grass on the lawn is kept at a certain height to realize the beauty and ornamentality of the lawn by regular trampling, to overcome the shortcomings of large noise, difficult to clean up the cut grass, and involving hard work by the existing lawn compactors.

The invention claimed is:

1. An automatic lawn compactor, comprising a case, a battery pack, a controller, a driving device and a trampling device, wherein the battery pack is disposed in the case, the battery pack is configured to supply electrical power to the driving device, the controller is connected with the driving device for controlling the driving device, the driving device is configured to drive the automatic lawn compactor to move autonomously on the lawn, the grass on the lawn is trampled by the trampling device as the automatic lawn compactor moves on the lawn;

wherein the driving device comprises at least two walking legs, the driving device is configured to drive the at least two walking legs to move alternately on the lawn, the trampling device are pressing plates mounted on the at least two walking legs.

2. The automatic lawn compactor of claim 1, wherein the automatic lawn compactor further comprises a height sensor for detecting a height of the grass on the lawn, the height sensor is connected with the controller, a height threshold value is preset in the controller, when the height of the grass on the lawn detected by the height sensor is greater than the height threshold value, the controller controls the automatic lawn compactor to activate its automatic compacting function.

3. The automatic lawn compactor of claim 1, wherein the automatic lawn compactor further comprises a camera, the camera is configured to scan a surrounding environment of the lawn to build a 2D map for autonomous positioning, the automatic lawn compactor tramples the grass on the whole lawn according to the 2D map.

4. The automatic lawn compactor of claim 3, wherein the camera is a 360° panoramic camera, and a 360° camera system is constructed by the panoramic camera.

5. The automatic lawn compactor of claim 1, wherein the automatic lawn compactor further comprises a ranging sensor, the ranging sensor is connected with the controller, the ranging sensor is configured to detect an information of obstacles in a surrounding environment of the case, the controller controls the automatic lawn compactor to move on the lawn by keeping away from the obstacles according to the detecting result by the ranging sensor.

6. The automatic lawn compactor of claim 5, wherein the ranging sensor are multiple, the multiple ranging sensors are distributed over an outer surface of the case.

7. The automatic lawn compactor of claim 1, wherein the automatic lawn compactor further comprises a positioning device and a wireless communication module, the positioning device is configured to obtain a positioning information of the automatic lawn compactor, the wireless communication module is configured to send the positioning information of the automatic lawn compactor and an image information captured by the camera to an electronic device.

8. The automatic lawn compactor of claim 1, wherein there is provided with a vacuum cleaning device under the case, for cleaning up the litter on the lawn.

9. The automatic lawn compactor of claim 1, wherein the automatic lawn compactor further comprises a solar panel, the solar panel is provided on an outer surface of the case, the solar panel is electrically connected with the battery pack, the solar panel is configured to charge the battery pack.

10. The automatic lawn compactor of claim 1, wherein the automatic lawn compactor further comprises an inductance detecting sensor, the inductance detecting sensor is connected with the controller, the inductance detecting sensor is configured to detect an electronic fence which is provided on the lawn, the controller controls the automatic lawn compactor to perform a trampling operation in the area defined by the electronic fence according the detecting result of the inductance detecting sensor.

11. The automatic lawn compactor of claim 10, wherein the inductance detecting sensor is provided at two sides of the case.

12. The automatic lawn compactor of claim 10, wherein the case is provided with a charging port electrically connected with the battery pack, and a charging station is provided on the electronic fence for charging the automatic lawn compactor.

13. An automatic lawn compacting method, comprising:
providing an automatic lawn trimmer compactor of claim 2;
using the height sensor provided on the automatic lawn compactor to detect a height of the grass on the lawn;
wherein when the height of the grass on the lawn detected by the height sensor is greater than a preset height, the height sensor sending a signal to the controller, the controller controlling the automatic lawn compactor to activate its automatic compacting function according to the signal, the driving device driving the automatic lawn compactor to move autonomously on the lawn, the grass on the lawn being trampled by the trampling device as the automatic lawn compactor moves on the lawn.

* * * * *